United States Patent [19]

Sung

[11] Patent Number: 4,659,337
[45] Date of Patent: Apr. 21, 1987

[54] MALEIC ANHYDRIDE-POLYETHER-POLYAMINE REACTION PRODUCT AND MOTOR FUEL COMPOSITION CONTAINING SAME

[75] Inventor: Rodney L. Sung, Fishkill, N.Y.

[73] Assignee: Texaco Inc., White Plains, N.Y.

[21] Appl. No.: 821,727

[22] Filed: Jan. 23, 1986

Related U.S. Application Data

[63] Continuation-in-part of Ser. No. 756,545, Jul. 19, 1985, abandoned.

[51] Int. Cl.⁴ ............................................... C10L 1/22
[52] U.S. Cl. ........................................... 44/63; 44/71
[58] Field of Search ............... 44/63, 71; 252/392; 562/564

[56] References Cited

U.S. PATENT DOCUMENTS

| | | | |
|---|---|---|---|
| 3,455,832 | 7/1969 | Davis | 44/63 |
| 3,920,698 | 11/1975 | Haemmerle et al. | 44/63 |
| 3,980,448 | 9/1976 | Haemmerle | 44/63 |
| 4,419,105 | 12/1983 | Sung | 44/71 |
| 4,477,261 | 10/1984 | Sung | 44/71 |
| 4,536,189 | 8/1985 | Sung | 44/63 |
| 4,604,103 | 8/1986 | Campbell | 44/72 |

*Primary Examiner*—Mrs. Y. Harris Smith
*Attorney, Agent, or Firm*—Robert A. Kulason; James J. O'Loughlin; Robert B. Burns

[57] ABSTRACT

A material is described having a use as a motor fuel additive for controlling engine octane requirement increase (ORI), controlling and reducing hydrocarbon and carbon monoxide engine emissions, and having carburetor detergency properties. Said material is the reaction product of maleic anhydride, a polyether polyamine, preferably a polyether diamine, and a hydrocarbyl polyamine, preferably an n-alkyl-alkylene diamine. A concentrate comprising the prescribed reaction product dissolved in a hydrocarbon solvent is also described. Motor fuels containing the reaction product additive of the instant invention show improved ORI control and carburetor detergency in comparison with motor fuels without said reaction product additive.

24 Claims, No Drawings

MALEIC ANHYDRIDE-POLYETHER-POLYAMINE REACTION PRODUCT AND MOTOR FUEL COMPOSITION CONTAINING SAME

BACKGROUND OF THE INVENTION

1. Field of the Invention

This application is a continuation-in-part of U.S. application Ser. No. 756,545, filed July 19, 1985, now abandoned.

This invention relates to a reaction product, a concentrate comprising said reaction product dissolved in a hydrocarbon solvent, and to a motor fuel composition containing said reaction product. More particularly, this invention relates to the reaction product of maleic anhydride, a polyether polyamine, preferably a polyether diamine, and a hydrocarbyl polyamine, preferably an n-alkyl-alkylene diamine, a concentrate comprising said reaction product dissolved in a hydrocarbon solvent, and to a motor fuel composition containing said reaction product.

Incomplete combustion of hydrocarbonaceous motor fuels in internal combustion engines is a common problem which often results in the formation and accumulation of carbon deposits at various locations within the engine. The presence of carbon deposits in the combustion chambers of an internal combustion engine interferes with the operating efficiency of the engine. Among other problems, these carbon deposits tend to accumulate within the combustion chamber, thus reducing the space available for combustion in the chambers during the compression of the fuel-air mixture. Consequently, a higher than design compression ratio is obtained, resulting in serious engine knocking. Under these conditions, the energy of combustion is not being effectively harnessed. Moreover, a prolonged period of engine knocking can cause stress fatigue and wear in vital parts of the engine. This octane requirement increase phenomenon (ORI) is well known in the art. One solution for this problem is the use of higher octane fuels to alleviate engine knock; however, higher octane fuels are expensive. It would thus be advantageous if ORI could be controlled by reducing or preventing the deposition of carbon deposits in the combustion chambers of the engine.

In addition, the presence and accumulation of carbon deposits in and around the carburetor restrict the flow of air through the carburetor at idle and at low speeds, resulting in an overrich fuel mixture. This condition produces further incomplete fuel combustion, resulting in rough engine idling and engine stalling, as well as excessive hydrocarbon and carbon monoxide exhaust emissions into the atmosphere. It would thus be desirable in view of both engine operability and overall air quality to provide a fuel composition which minimizes or overcomes the above-described problems.

2. Information Disclosure Statement

U.S. Pat. No. 4,536,189 discloses the use of the reaction product of maleic anhydride, a hydrocarbon-substituted mono primary amino or mono primary ether amine, and a heterocyclic compound selected from the group consisting of 5-amino-1,3,4-thiadiazole-2-thiol and benzotriazole as an anti-corrosion additive in motor fuels;

U.S. Pat. No. 4,477,261 discloses the use of polyether amino-amide compositions prepared by reacting a polyether amino acid with ethylene diamine or diethylene diamine as an ORI inhibitor and carburetor detergent in motor fuels;

U.S. Pat. No. 4,419,105 discloses the use of the reaction product of maleic anhydride and certain amines or diamines as corrosion inhibitors in alcohols;

U.S. Pat. No. 4,321,062 discloses the use of the reaction product of maleic anhydride, certain phenols, and certain alkyl-alkylene diamines as a corrosion inhibitor and carburetor detergent additive in motor fuels;

U.S. Pat. No. 4,290,778 discloses the use of the reaction product of a hydrocarbyl alkoxyalkylene diamine and maleic anhydride as a corrosion inhibitor and carburetor detergent additive in motor fuels;

U.S. Pat. No. 4,207,079 discloses the use of the reaction produce of maleic anhydride and certain alkyl-alkylene diamines as a corrosion inhibitor and carburetor detergent additive in motor fuels;

U.S. Pat. No. 4,144,034 discloses the use of the reaction product of a polyether amine and maleic anhydride as a carburetor detergent and corrosion inhibitor in motor fuels;

U.S. Pat. No. 3,920,698 discloses the use of the reaction product of a maleic anhydride, a linear polyamine, and optionally at least one alkylphosphonic acid as an additive in motor fuels;

U.S. Pat. No. 3,773,479 discloses the use of the reaction product of maleic anhydride and alkyl or alkylene amines as a carburetor detergent, corrosion inhibitor, and anti-icing additive in motor fuels;

U.S. Pat. No. 3,455,832 discloses the use of the reaction product of a polyalkenyl succinic anhydride, a polyamine, and a carbonyl containing aromatic or heterocyclic compound as a detergent in lubricating oils and liquid hydrocarbon fuels;

U.S. patent application Ser. No. 746,816, filed June 30, 1985 discloses an alcohol-containing motor fuel which also contains a wear-inhibiting additive which is a condensate product of the reaction of: a dibasic acid anhydride, preferably maleic anhydride; a polyoxyisopropylene diamine represented by the formula

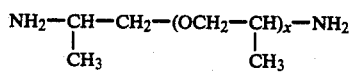

where x has a value of about 2-68, preferably 2-33; and a n-alkyl-alkylene diamine; and U.S. patent application Ser. No. 775,086, filed Sept. 12, 1985 discloses a reaction product for use as an additive in motor fuels to reduce combustion chamber deposits. The reaction product disclosed is the reaction product of: a dibasic acid anhydride; a polyoxyisopropylene diamine of the formula

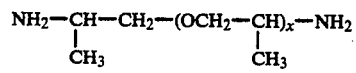

where x is a numeral of about 2-50; and a polyalkylene polyamine.

SUMMARY OF THE INVENTION

It has been discovered that the reaction product of maleic anhydride, a polyether polyamine, and a hydrocarbyl polyamine has utility as an ORI inhibitor and carburetor detergent additive when employed in a motor fuel composition. The novel reaction product of the instant invention is obtained by reacting:
(a) 1 mole of maleic anhdride;
(b) 1-2 moles, preferably 1.5 moles of a polyether polyamine represented by the formula

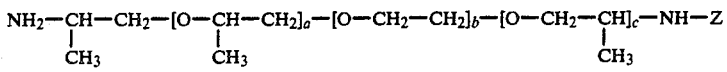

where b has a value from about 5-150, preferably from about 8-50, a+c has a value from about 2-20, preferably from about 2.5-10, and Z is selected from the group consisting of
(i) a hydrogen atom;
(ii) an alkyl radical having from 1-6 carbon atoms;
(iii) a polyether radical of the formula

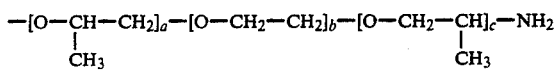

where b has a value from about 5-150, preferably from about 8-50, and a+c has a value from about 2-20; preferably from about 2.5-10;
(iv) an alkylene polyether radical of the formula

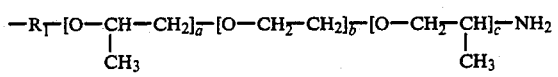

where $R_1$ is an alkylene radical having from about 1-6, preferably 1-3 carbon atoms, b has a value from about 5-150, preferably from about 8-50, and a+c has a value from about 2-20 preferably from about 2.5-10; and
(v) a radical of the formula

where $R_2$ is an alkyl radical having from about 1-20, preferably 12-20 carbon atoms, $R_3$ is an alkylene radical having from about 1-6 carbon atoms, and x has a value from about 1-10, preferably from about 1-5; and
(c) 1-2 moles, preferably 1 mole of a hydrocarbyl polyamine of the formula
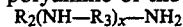

where $R_2$ is an alkyl radical having from about 1-20, preferably 12-20 carbon atoms, $R_3$ is an alkylene radical having from about 1-6 carbon atoms, and x has a value from about 1-10, preferably 1-5.

In a preferred embodiment, the novel reaction product of the instant invention is obtained by reacting maleic anhydride, a polyether diamine of the formula:

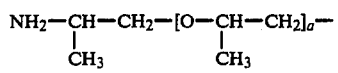

where b has a value from about 5 to 150, preferably from about 8 to 50, and a+c has a value from about 2 to 20, preferably from about 2.5 to 10, and a n-alkyl-alkylene diamine represented by the formula:

$$R-NH-(CH_2)_n-NH_2$$

where R is an aliphatic hydrocarbon radical having from about 8 to 24 carbon atoms, preferably from about 12 to 20 carbon atoms, and n has a value from about 1 to 5, and preferably has a value of 3.

The instant invention is also directed to a concentrate comprising 1.0-75.0 wt.% of the prescribed reaction product dissolved in a hydrocarbon solvent such as toluene or xylene, and to a motor fuel composition containing the prescribed reaction product, said motor fuel exhibiting substantially reduced ORI tendencies and improved carburetor detergency properties.

DETAILED EMBODIMENTS OF THE INVENTION

The novel reaction product of the instant invention is prepared by reacting maleic anhydride, a polyether polyamine, preferably a polyether diamine, and a hydrocarbyl polyamine, preferably an n-alkyl-alkylene diamine. The polyether polyamine may be generally represented by the formula:

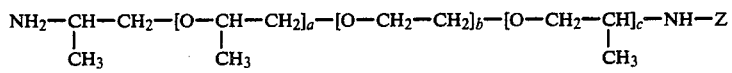

where b has a value from about 5-150, preferably from about 8-50, a+c has a value from about 2-20, preferably from about 2.5-10, and Z is selected from the group consisting of
(i) a hydrogen atom;
(ii) an alkyl radical having from 1-6 carbon atoms;
(iii) a polyether radical of the formula

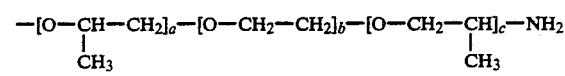

where b has a value from about 8-50, preferably from about 8-50, a+c has a value from about 2-20, preferably from about 2.5-10;
(iv) an alkylene polyether radical of the formula

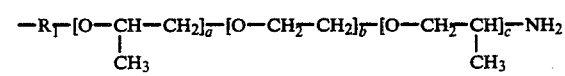

where $R_1$ is an alkylene radical having from about 1-6, preferably 1-3 carbon atoms, b has a value from about 5-150, preferably about 8-50, and a+c has a value from about 2-20, preferably from about 2.5-10; and (v) a radical of the formula

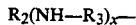

where $R_2$ is an alkyl radical having from about 1-20, preferably 12-20 carbon atoms, $R_3$ is an alkylene radical having from about 1-6 carbon atoms, and x has a value from about 1-10, preferably from about 1-5.

The preferred polyether polyamine reactant is a polyether diamine of the formula:

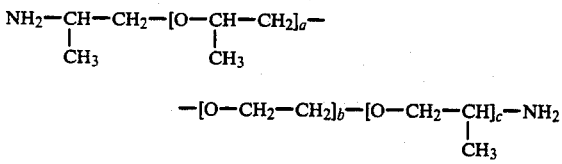

where b has a value from about 5 to 150, preferably from about 8 to 50, and a+c has a value from about 2 to 20, preferably from about 2.5 to 10. Polyether diamines suitable for use in preparing the reaction product of the instant invention include polyether diamines commercially available from Texaco Chemical Co. under the JEFFAMINE ED series trade name. Examples of these polyether diamines include JEFFAMINE ED-600, ED-900, ED-2001, ED-4000, and ED-6000. A critical feature in the reaction product of the instant invention is the presence of a substantial portion of oxyethylene ether moieties provided by the prescribed polyether polyamine reactant.

The hydrocarbyl polyamine reactant may be generally represented by the formula:

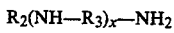

where $R_2$ is an alkyl radical having from about 1-20, preferably 12-20 carbon atoms, $R_3$ is an alkylene radical having from about 1-6 carbon atoms, and x has a value from about 1-10, preferably 1-5.

The preferred hydrocarbyl polyamine reactant is a n-alkyl-alkylene diamine of the formula:

where R is an aliphatic hydrocarbon radical having from about 8 to 24 carbon atoms, preferably from about 12 to 20 carbon atoms, and n has a value from about 1 to 5, preferably having a value of 3. N-alkyl-alkylene diamines suitable for use in preparing the reaction product of the instant invention include aliphatic diamines commercially available from Akzo Chemie America Co. under the DUOMEEN series trade name. Examples of such n-alkyl-alkylene diamines include:
- n-coco-1,3-diaminopropane (DUOMEEN C);
- n-soya-1,3-diaminopropane (DUOMEEN S);
- n-tallow-1,3-diaminopropane (DUOMEEN T); and
- n-oleyl-1,3-diaminopropane (DUOMEEN OL).

The reaction product of the instant invention is prepared by first reacting about 1 to 2 moles, preferably 1 mole, of maleic anhydride with about 1 to 2 moles, preferably 1.5 moles, of the prescribed polyether polyamine. The reaction of maleic anhydride with the polyether polyamine is preferably carried out in the presence of a solvent. A preferred solvent is one which will distill with water azeotropically. Suitable solvents include hydrocarbons boiling in the gasoline boiling range of about 30° C. to about 200° C. Generally, this will include saturated and unsaturated hydrocarbons having from about 5 to about 10 carbon atoms. Specific suitable hydrocarbon solvents include hexane, cyclohexane, benzene, toluene, and mixtures thereof. Xylene is the preferred solvent. The solvent can be present in an amount of up to about 90% by weight of the total reaction mixture.

In a preferred method for preparing the reaction product, about 1 mole of maleic anhydride and about 1.5 moles of polyether polyamine are combined with the solvent xylene and reacted at a temperature of about 100° C. The reaction mixture is maintained at this temperature for approximately 2 hours. The mixture is then cooled at about 60° C., whereupon 1 to 2 moles, preferably 1 mole, of the hydrocarbyl polyamine is added. The new mixture is then reacted at about 100° C. for approximately 2 hours. The reaction product can then be separated from the solvent using conventional means, or left in admixture with some or all of the solvent to facilitate addition of the reaction product to gasoline or another motor fuel composition.

A substantial portion of the total reaction product mixture may be represented structurally as:

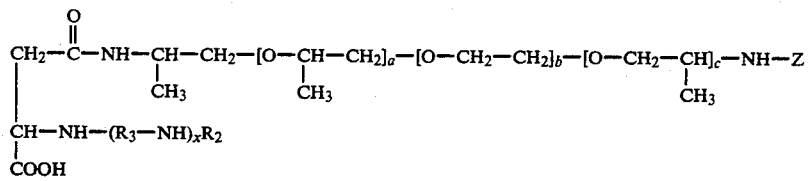

where Z, $R_2$, $R_3$, x, b, and a+c are as previously described.

The following examples illustrate the preferred method of preparing the reaction product of the instant invention. It will be understood that the following examples are merely illustrative, and are not meant to limit the invention in any way. In the examples, all parts are parts by weight unless otherwise specified.

EXAMPLE I

A reaction product was formed by reacting 24.5 parts of maleic anhydride, 692 parts of xylene, and 236.7 parts of the polyether diamine JEFFAMINE ED-600 and 100° C. for 2 hours. JEFFAMINE ED-600 is a polyether diamine of approximate molecular weight 600 having the general formula:

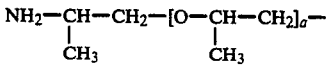

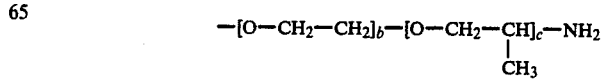

where b has an approximate value of 8.5, and a+c has an approximate value of 2.5. The mixture was thereafter cooled to about 60° C., and 93.5 parts of n-tallow-1,3 diaminopropane (DUOMEEN T) were added. The new mixture was then reacted at about 100° C. for 2 hours to produce the final reaction product. The reaction product was filtered and stripped of remaining solvent under a vacuum. Spectroscopic analysis indicated that a substantial portion of the reaction product of the instant example may be represented structurally as:

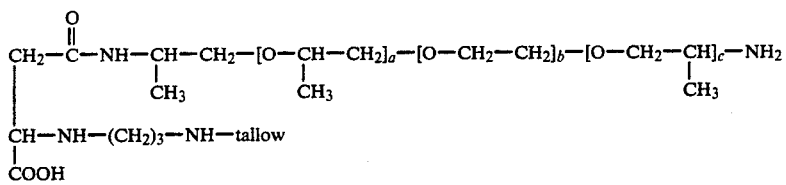

where b has an approximate value of 8.5, and a+c has an approximate value of 2.5.

EXAMPLE II

A reaction product was formed by reacting 20 parts of the maleic anhydride, 689 parts of xylene, and 284 parts of the polyether diamine JEFFAMINE ED-900 to 100° C. for 2 hours. JEFFAMINE ED-900 is a polyether diamine of approximate molecular weight 900 having the general formula:

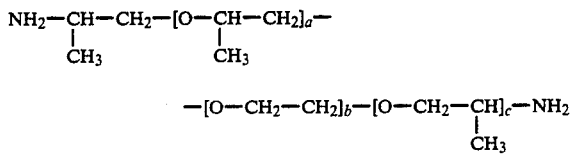

where b has an approximate value of 15.5, and a+c has an approximate value of 2.5. The mixture was thereafter cooled to about 60° C., and 75 parts of n-tallow-1,3-diaminopropane (DUOMEEN T) were added. The new mixture was then reacted at about 100° C. for 2 hours to produce the final reaction product. The reaction product was filtered and stripped for remaining solvent under a vacuum.

EXAMPLE III

A reaction product was formed by reacting 9.8 parts of maleic anhydride, 689 parts of xylene, and 336.6 parts of the polyether diamine JEFFAMINE ED-2001 at 100° C. for 2 hours. JEFFAMINE ED-2001 is a polyether diamine of approximate molecular weight 2000 having the general formula:

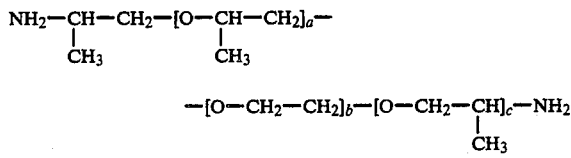

where b has an approximate value of 40.5, and a+c has an approximate value of 2.5. The mixture was thereafter cooled to about 60° C., and 37.4 parts of n-tallow-1,3- diaminopropane (DUOMEEN T) were added. The new mixture was then reacted at about 100° C. for 2 hours to produce the final reaction product. The reaction product was filtered and stripped of remaining solvent under vacuum.

EXAMPLE IV

A reaction product was formed by reacting 32.7 parts of maleic anhydride, 516 parts of xylene, and 315.5 parts of the polyether diamine JEFFAMINE ED-600 at 100° C. for 2 hours. JEFFAMINE ED-600 is a polyether diamine of approximate molecular weight 600 having the general formula:

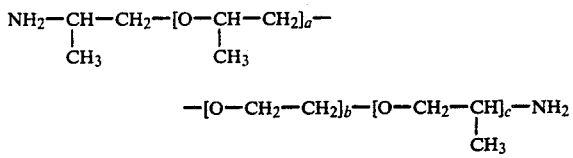

where b has an approximate value of 8.5, and a+c has an approximate value of 2.5. The mixture was thereafter cooled to about 60° C., and 107 n-oleyl-1,3-diaminopropane (DUOMEEN OL) were added. The new mixture was then reacted at about 100° C. for 2 hours to produce the final reaction product. The reaction product was filtered and stripped of remaining solvent under vacuum.

EXAMPLE V

A reaction product was formed by reacting 19.6 parts of maleic anhydride, 518 parts of xylene, and 284 parts of the polyether diamine JEFFAMINE ED-900 at 100° C. for 2 hours. JEFFAMINE ED-900 is a polyether diamine of approximate molecular weight 900 having the general formula:

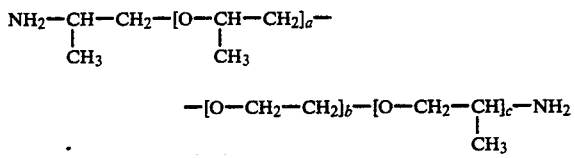

where b has an approximate value of 15.5, and a+c has an approximate value of 2.5. The mixture was thereafter cooled to about 60° C., and 64.2 parts of n-oleyl-1,3-diaminopropane (DUOMEEN OL) were added. The new mixture was then reacted at about 100° C. for 2 hours to produce the final reaction product. The reaction product was filtered and stripped of remaining solvent under vacuum.

EXAMPLE VI

A reaction product was formed by reacting 9.8 parts of maleic anhydride, 518 parts of xylene and 336.6 parts of the polyether diamine JEFFAMINE ED-2001 at 100° C. for 2 hours. JEFFAMINE ED-2001 is a polyether diamine of approximate molecular weight 2000 having the general formula:

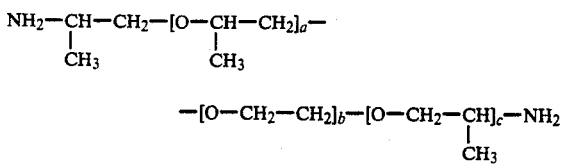

where b has an approximate value of 40.5, and a+c has an approximate value of 2.5. The mixture was thereafter cooled to about 60° C., and 32.1 parts of n-oleyl-1,3-diaminopropane (DUOMEEN OL) were added. The mixture was then reacted at about 100° C. for 2 hours to produce the final reaction product. The reaction product was filtered and stripped of remaining solvent under vacuum.

It has been found that a motor fuel composition containing the reaction product of the instant invention is surprisingly effective in minimizing and reducing the ORI of a gasoline internal combustion engine. This improvement has been demonstrated in engine tests where the performance characteristics of a base motor fuel composition and an improved motor fuel composition of the instant invention were compared. The specific engine tests were made on a RDH single cylinder engine (RDH Test) and a 2.0 liter Chevrolet (Throttle Body) four cylinder engine (Chevy Test). These tests correlate well with results obtained via road simulation tests.

The base motor fuel employed in these tests (herein designated as Base Fuel A) was a premium grade gasoline essentially unleaded (less than 0.05 g of tetraethyl lead per gallon), and comprised a mixture of hydrocarbons boiling in the gasoline boiling range consisting of about 22% aromatic hydrocarbons, 11% olefinic carbons, and 67% paraffinic hydrocarbons, boiling in the range from about 90° F. to 450° F. In preparing motor fuels for the above-named tests, a suitable amount of reaction product of the instant invention was added to Base Fuel A in the following manner: First, the reaction product was dissolved in a minor amount of a polar solvent, and the resulting solution containing the reaction product was mixed with the base fuel. In the test examples, approximately 1.6% by volume of polar solvent based on the total volume of the fuel composition was employed. The polar solvent employed in the test examples was methanol. The reaction product-polar solvent mixture was thereafter dissolved in a major amount of the unleaded base fuel. In general, from about 0.1-3.0 volume percent of polar solvent based on the volume of the fuel composition may be employed. Suitable polar solvents for use with the instant invention include acetone, methyl ethyl ketone, ethanol, methanol, isopropanol, or t-butyl alcohol. The ORI tendencies of Base Fuel A as well as Base Fuel A containing 100 PTB (pounds of additive per thousand barrels of fuel) of the reaction product of Example III were first measured using the RDH Test. The test facility uses a closed air system with fuel introduced by a pneumatic atomizing spray nozzle. Before entering the module, the air is filtered and treated by (in order): a gel, oil vapor remover and Ultipore filter to ensure that the engine charge air contains minimum amounts of water, oil droplets and vapors. Engine air flow, measured by a sharp edged orifice, is heated in a surge tank and mixed with the fuel near the engine intake port. Fuel flow is measured with a Cox Instruments flow meter. The fuel and air systems provide close control of the intake charge to the engine under cycling conditions and during octane rating of the engine.

An engine's octane requirements directly reflect the condition to which the end gases are subjected. ORI with a fuel and/or lubricant reflects the amount and type of combustion chamber deposits which the fuel and/or lubricant cause. If the rating conditions such as mixture temperature, intake charge rate, coolant temperature, engine speed, etc. which affect the state of end gases are kept constant from one rating to the other, any change in the state of the end gases will be in consequence to change in combustion chamber deposits. Subsequently, the octane requirement of the engine will increase as the deposits accumulate and eventually the octane requirement will stabilize with the stabilization of combustion chamber deposits.

As illustrated by Table I, the RDH Test data indicate that the ORI tendencies of Base Fuel A were consistently higher than those for Base Fuel A containing 100 PTB of reaction product (Example III). After approximately 200 hours of engine operation in the RDH Test, Base Fuel A gave an ORI number approximately 3.9 units higher than the base fuel containing 100 PTB of reaction product.

The ORI tendencies of Base Fuel A as well as Base Fuel A containing 100 PTB of the reaction product of Example III were also measured using the Chevy Test. The Chevy Test employs a 2.0 liter Chevrolet in-line four cylinder engine with a cast alloy iron cylinder head having separate intake and exhaust ports for each cylinder. An electronically controlled fuel injection system maintains the required fuel flow to each engine cylinder by monitoring various engine operating parameters (e.g. manifold absolute pressure, throttle valve position, coolant temperature, engine r.p.m., and exhaust gas oxygen content) and adjusting the fuel flow accordingly. The fuel system supplying fuel in the engine is specifically adapted for the determination of engine ORI. At the beginning of the engine rating procedure, a fuel with an octane rating high enough to ensure that no audible engine knock is present is employed. The next lower octane fuel is then switched with the previous fuel, and this procedure continues until a knock becomes audible. The difference between the octane level at knock and no-knock conditions is the engine ORI. Engine ORI was determined as a function of hours of engine operation for both Base Fuel A and Base Fuel A containing 100 PTB of reaction product.

As illustrated by Table I, the Chevy Test data indicate that the ORI tendencies of Base Fuel A were consistently higher than those for Base Fuel A containing 100 PTB of reaction product (Example III). After about 200 hours of engine operation in the Chevy Test, Base Fuel A gave an ORI number approximately 3.2 units higher than Base Fuel A containing 100 PTB of reaction product (Example III). The RDH Test and Chevy Test data of Table I thus indicate that the reaction product of the instant invention is very effective as an ORI controlling additive in a motor fuel composition.

TABLE I

| ORI ENGINE TEST RESULTS | | |
|---|---|---|
| Engine Operation (hours) | RDH Test ΔORI* | Chevy Test ΔORI* |
| 25 | 0.8 | 0.2 |
| 50 | 1.3 | 0.8 |

TABLE I-continued

ORI ENGINE TEST RESULTS

| Engine Operation (hours) | RDH Test ΔORI* | Chevy Test ΔORI* |
|---|---|---|
| 75 | 1.9 | 0.8 |
| 100 | 2.3 | 0.8 |
| 125 | 2.7 | 1.0 |
| 150 | 3.1 | 1.8 |
| 175 | 3.3 | 2.6 |
| 200 | 3.9 | 3.2 |

*ΔORI = ORI$_{(Base\ Fuel\ A)}$ − ORI$_{(Base\ Fuel\ A+100\ PTB\ Example\ III)}$ It has also been found that certain specific reaction products of the instant invention, when added to a motor fuel composition, have utility as carburetor detergents, i.e. for reducing and preventing the accumulation of carbon deposits in and around the throttle valve in a carburetor. For example, the reaction products set forth by Examples I, II and III of the instant invention were tested for their carburetor detergency properties as compared with a commercial motor fuel carburetor detergent additive. The tests were run on a Chevrolet V-8 engine mounted on a test stand using a modified four barrel carburetor. The primary carburetor barrels were modified in that they has removable aluminum sleeves in the throttle plate area so that carbonaceous deposits formed on the sleeves in this area could be conveniently weighed.

The test procedure was designed to determine the effectiveness of a given motor fuel additive in preventing or minimizing carbonaceous deposits in the area of the carburetor. After the engine was run continuously for 72 hours, the sleeves were removed from the carburetor and weighed to determine the extent of carbonaceous deposit formation. As shown in Table II, Base Fuel A containing 20 PTB of the reaction products set forth by Examples I, II, and III respectively were tested. In addition, Base Fuel A containing the commercial carburetor detergent was tested to provide a standard.

TABLE II

CHEVY CARBURETOR DETERGENCY TEST RESULTS

| Fuel Mixture | Deposits on Carburetor Sleeve in 72 Hrs. (mg) |
|---|---|
| Base Fuel A + 20 PTB reaction product (Example I) | 1.7 |
| Base Fuel A + commercial detergent | 0.4 |
| Base Fuel A + 20 PTB reaction product (Example II) | 1.1 |
| Base Fuel A + commercial detergent | 0.3 |
| Base Fuel A + 20 PTB reaction product (Example III) | 3.0 |
| Base Fuel A + commercial detergent | 1.7 |

The data in Table II shows that the reaction products set forth by Examples I, II, and III of the instant invention, when employed in a motor fuel composition, were effective as carburetor detergents. The test fuels containing the additive of the instant invention provided a substantial improvement in carburetor detergency over the typical behavior of an unleaded base fuel containing no carburetor detergent additive.

The following examples are additional illustrations of the reaction product and fuel composition of the instant invention.

EXAMPLE VII

A motor fuel composition is obtained by mixing a reaction product of the instant invention with Base Fuel A in the proportions of about 100 PTB of reaction product (100 pounds of reaction product per 1,000 barrels of gasoline, equivalent to about 0.04 wt.% of the additive reaction produce based upon the weight of the fuel composition), said reaction product being produced according to the method described in Example I by reacting a mole of maleic anhydride with about 1.5 moles of a polyether polyamine of the formula

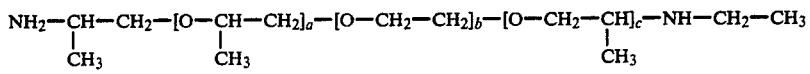

where b has an approximate value value of 45, and a+c has an approximate value of about 4, and thereafter reacting said intermediate reaction product with about 1 mole of a hydrocarbyl polyamine of the formula

EXAMPLE VIII

A motor fuel composition is produced as described in Example VII using a reaction product obtained by reacting a mole of maleic anhydride with about 1.5 moles of a polyether polyamine of the formula

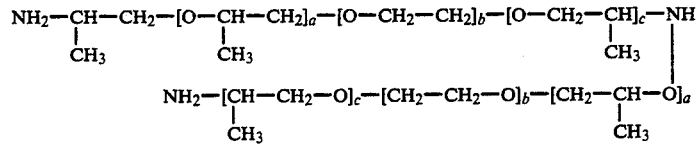

where b has a value of about 30, and a+c has a value of about 2.5, and thereafter reacting said intermediate reaction product with about 1 mole of a hydrocarbyl polyamine of the formula

EXAMPLE IX

A motor fuel composition is produced as described in Example VII using a reaction product obtained by reacting a mole of maleic anhydride with about 1.5 moles of a polyether polyamine of the formula

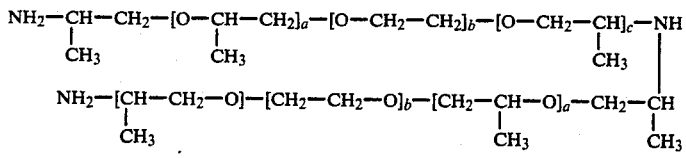

where b has a value of about 50 and a+c has a value of about 3 and thereafter reacting said intermediate reaction product with about 1 mole of a hydrocarbyl polyamine of the formula $$CH_3-(CH_2)_8-NH-(CH_2)_4-NH_2$$

It has also been found that certain specific reaction products of the instant invention, when added to a motor fuel composition, have utility in reducing engine hydrocarbon and carbon monoxide emissions as compared with the level of such emissions when a motor fuel without such a reaction product additive is combusted.

A postulated mechanism for the above-demonstrated effectiveness of the reaction product of the instant invention as an ORI controlling motor fuel additive with carburetor detergency properties would be as follows. The reaction product is a highly polar compound, and thus acts as a surface active agent when added to a motor fuel. The polarity of the reaction product tends to attract carbonaceous deposits located within the engine combustion chamber and in and around the carburetor, and the deposits are thus removed from the metal surfaces within the combustion chamber and in and around the carburetor. The removal of these deposits accounts for the ORI controlling and carburetor detergency properties of the reaction product set forth by the instant invention when it is employed as a motor fuel additive. Note that the above-postulated mechanism is given only as a possible mechanism, and that the instant invention resides in the above-described reaction product and motor fuel compositions containing such a reaction product.

Preferred motor fuel compositions for use with the reaction product additive set forth by the instant invention are those intended for use in spark ignition internal combustion engines. Such motor fuel compositions, generally referred to as gasoline base stocks, preferably comprise a mixture of hydrocarbons boiling in the gasoline boiling range, preferably from about 90° F. to about 450° F. This base fuel may consist of straight chains or branched chains or paraffins, cycloparaffins, olefins, aromatic hydrocarbons, or mixtures thereof. The base fuel can be derived from, among others, straight run naphtha, polymer gasoline, natural gasoline, or from catalytically cracked or thermally cracked hydrocarbons and catalytically reformed stock. The composition and octane level of the base fuel are not critical and any conventional motor fuel base can be employed in the practice of this invention. In addition, the motor fuel composition may contain any of the additives generally employed in gasoline. Thus, the fuel composition can contain anti-knock compounds such as tetraethyl lead compounds, anti-icing additives, upper cylinder lubricating oils, and the like.

In general, the reaction product of the instant invention is employed in a motor fuel composition at a concentration ranging from about 0.0005 to about 0.5 weight percent. More effective fuel compositions of the instant invention are obtained when the additive reaction product is employed at concentrations ranging from 0.001 to about 0.1 weight percent, with the preferred concentration range being from about 0.01–0.05 weight percent.

For convenience and economy in shipping and handling, it is conventional to prepare concentrates of the reaction product of the instant invention for use as additives in motor fuel compositions. The reaction product of the instant invention may be prepared as a concentrate in a suitable liquid hydrocarbon solvent. Such a concentrate may contain from about 1.0–75.0 wt.% of the reaction product dissolved in the hydrocarbon solvent, with the preferred concentration being from about 5.0–35.0 wt%. Suitable hydrocarbon solvents for use in the above-described concentrate include toluene and xylene; xylene is the preferred hydrocarbon solvent for use.

It is unexpected and surprising that the reaction product set forth by the instant invention is an effective ORI controlling agent and exhibits carburetor detergency properties when employed in minor amounts as an additive in motor fuels.

It will be evident that the terms and expressions employed herein are used as terms of description and not of limitation. There is not intention, in the use of these descriptive terms and expressions, of excluding equivalents of the features described and it is recognized that various modifications are possible within the scope of the invention claimed.

The invention claimed is:

1. A composition comprising the reaction product of 1 mole of maleic anhydride, about 1 to 2 moles of a polyether diamine, and about 1 to 2 moles of a n-alkyl-alkylene diamine, where said polyether diamine reactant is represented by the formula:

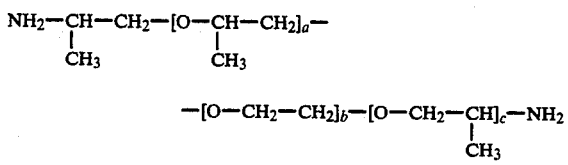

where b has a value from about 5 to 150 and a+c has a value from about 2 to 20, and said n-alkyl-alkylene diamine reactant is represented by the formula:

$$R-NH-(CH_2)_n-NH_2$$

where R is an aliphatic hydrocarbon radical having from about 8 to 24 carbon atoms and n has a value from about 1 to 5.

2. A composition according to claim 1, in which said reaction product is obtained by reacting 1 mole of said maleic anhydride with about 1.5 moles of said polyether diamine and about 1 mole of said n-alkyl-alkylene diamine.

3. A composition according to claim 1, where b has a value from about 8 to 50, a+c has a value from about 2.5 to 10, n is equal to 3, and R is an aliphatic hydrocarbon radical having from about 12 to 20 carbon atoms.

4. A composition according to claim 1, where said n-alkyl-alkylene diamine is selected from the group consisting of:
n-coco-1,3-diaminopropane;
n-soya-1,3-diaminopropane;
n-tallow-1,3-diaminopropane; and
n-oleyl-1,3-diaminopropane.

5. A motor fuel composition comprising a mixture of hydrocarbons boiling in the range from about 90° F. to 450° F. containing from about 0.0005 to 0.5 weight percent of the reaction product of 1 mole of maleic anhydride, about 1 to 2 moles of a polyether diamine, and about 1 to 2 moles of n-alkyl-alkylene diamine, where said polyether diamine is represented by the formula:

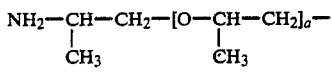

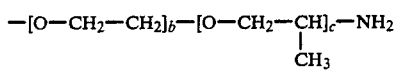

where b has a value from about 5 to 150 and a+c has a value from about 2 to 20, and said n-alkyl-alkylene diamine is represented by the formula:

R—NH—(CH$_2$)$_n$—NH$_2$ ps where R is an aliphatic hydrocarbon radical having from about 8 to 24 carbon atoms and n has a value from about 1 to 5.

6. A motor fuel composition according to claim 5, in which said reaction product is obtained by reacting 1 mole of said maleic anhydride with about 1.5 moles of said polyether diamine and about 1 mole of said n-alkyl-alkylene diamine.

7. A motor fuel composition according to claim 5, where b has a value from about 8 to 50, a+c has a value from about 2.5 to 10, n is equal to 3, and R is an aliphatic hydrocarbon radical having from about 12 to 20 carbon atoms.

8. A motor fuel composition according to claim 5, where said n-alkyl-alkylene diamine is selected from the group consisting of:
n-coco-1,3-diaminopropane;
n-soya-1,3-diaminopropane;
n-tallow-1,3-diaminopropane; and
n-oleyl-1,3-diaminopropane.

9. A motor fuel composition according to claim 5 containing from about 0.001 to 0.1 weight percent of said reaction product.

10. A motor fuel composition according to claim 6 containing from about 0.001 to 0.1 weight percent of said reaction product.

11. A motor fuel composition according to claim 7 containing from about 0.001 to 0.1 weight percent of said reaction product.

12. A motor fuel composition according to claim 8 containing from about 0.001 to 0.1 weight percent of said reaction product.

13. A composition comprising the reaction product of:
(a) 1 mole of maleic anhydride;
(b) 1-2 moles of a polyether polyamine represented by the formula:

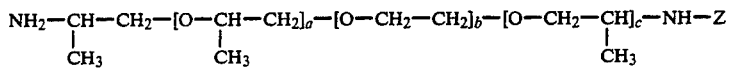

where b has a value from about 5-150, a+c has a value from about 2-20, and Z is selected from the group consisting of
(i) a hydrogen atom;
(ii) an alkyl radical having from 1-6 carbon atoms;
(iii) a polyether radical of the formula

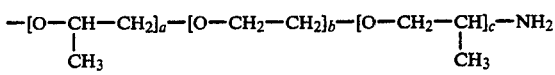

where b has a value from about 5-150, and a+c has a value from about 2-20;
(iv) an alkylene polyether radical of the formula

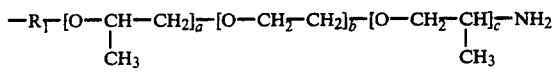

where R$_1$ is an alkylene radical having from about 1-6 carbon atoms, b has a value from about 5-150, and a+c has a value from about 2-20; and
(v) a radical of the formula

where R$_2$ is an alkyl radical having from about 1-20 carbon atoms, R$_3$ is an alkylene radical having from about 1-6 carbon atoms, and x has a value from about 1-10; and
(c) 1-2 moles of a hydrocarbyl polyamine of the formula

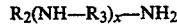

where R$_2$ is an alkyl radical having from about 1-20 carbon atoms, R$_3$ is an alkylene radical having from about 1-6 carbon atoms, and x has a value from about 1-10.

14. A composition according to claim 13, in which said reaction product is obtained by reacting 1 mole of said maleic anhydride with about 1.5 moles of said polyether polyamine and about 1 mole of said hydrocarbyl polyamine.

15. A composition according to claim 13, in which said reaction product is obtained by reacting:
(a) 1 mole of maleic anhydride;
(b) 1-2 moles of a polyether polyamine represented by the formula:

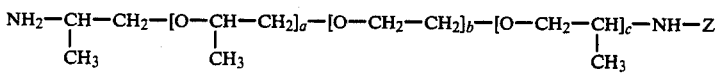

where b has a value from about 8-50, a+c has a value from about 2.5-10, and Z is selected from the group consisting of
(i) a hydrogen atom;
(ii) an alkyl radical having from 1-6 carbon atoms;
(iii) a polyether radical of the formula

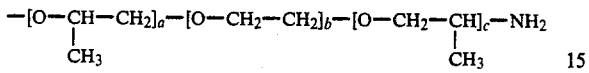

where b has a value from about 8-50, and a+c has a value from about 2.5-10;
(iv) an alkylene polyether radical of the formula

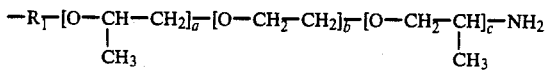

where $R_1$ is an alkylene radical having from about 1-3 carbon atoms, b has a value from about 8-50, and a+c has a value from about 2.5-10; and
(v) a radical of the formula

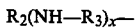

where $R_2$ is an alkyl radical having from about 12-20 carbon atoms, $R_3$ is an alkylene radical having from about 1-6 carbon atoms, and has a value from about 1-5; and
(c) 1-2 moles of a hydrocarbyl polyamine of the formula

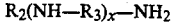

where $R_2$ is a alkyl radical having from about 12-20 carbon atoms, $R_3$ is an alkylene radical having from about 1-6 carbon atoms, and x has a value from about 1-5.

16. A composition according to claim 15, in which said reaction product is obtained by reacting 1 mole of maleic anhydride with about 1.5 moles of said polyether polyamine and about 1 mole of said hydrocarbyl polyamine.

17. A motor fuel composition comprising a mixture of hydrocarbons boiling in the range from about 90° F. to 450° F. containing from about 0.0005 to 0.5 weight percent of the reaction product of:
(a) 1 mole of maleic anhydride;
(b) 1-2 moles of a polyether polyamine represented by the formula:

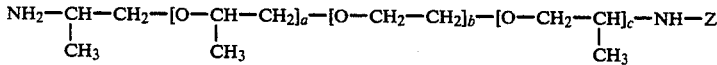

where b has a value from about 5-150, a+c has a value from about 2-20, and Z is selected from the group consisting of
(i) a hydrogen atom;
(ii) an alkyl radical having from 1-6 carbon atoms;
(iii) a polyether radical of the formula

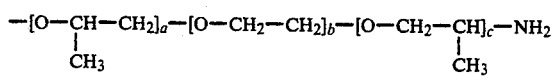

where b has a value from about 5-150, and a+c has a value from about 2-20;
(iv) an alkylene polyether radical of the formula

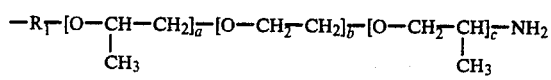

where $R_1$ is an alkylene radical having from about 1-6 carbon atoms, b has a value from about 5-150, and a+c has a value from about 2-20; and
(v) a radical of the formula

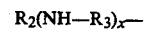

where $R_2$ is an alkyl radical having from about 1-20 carbon atoms, $R_3$ is an alkylene radical having from about 1-6 carbon atoms, and x has a value from about 1-10; and
(c) 1-2 moles of a hydrocarbyl polyamine of the formula

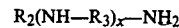

where $R_2$ is alkyl radical having from about 1-20 carbon atoms, $R_3$ is an alkylene radical having from about 1-6 carbon atoms, and x has a value from about 1-10.

18. A motor fuel composition according to claim 17, in which said reaction product is obtained by reacting 1 mole of said maleic anhydride with about 1.5 moles of said polyether polyamine and about 1 mole of said hydrocarbyl polyamine.

19. A motor fuel composition according to claim 17, in which said motor fuel composition comprises the reaction product of:
(a) 1 mole of maleic anhydride;
(b) 1-2 moles of a polyether polyamine represented by the formula:

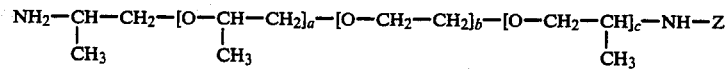

where b has a value from about 8-50, a+c has a value from about 2.5-10, and Z is selected from the group consisting of (i) a hydrogen atom;
(ii) an alkyl radical having from 1-6 carbon atoms;
(iii) a polyether radical of the formula

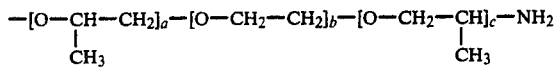

where b has a value from about 8-50, and a+c has a value from about 2.5-10;
(iv) an alkylene polyether radical of the formula

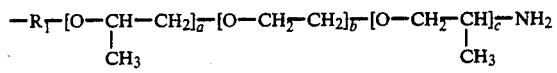

where $R_1$ is an alkylene radical having from about 1-3 carbon atoms, b has a value from about 8-50, and a+c has a value from about 2.5-10; and
(v) a radical of the formula

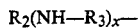

where $R_2$ is an alkyl radical having from about 12-20 carbon atoms, $R_3$ is an alkylene radical having from about 1-6 carbon atoms, and x has a value from about 1-5; and
(c) 1-2 moles of a hydrocarbyl polyamine of the formula

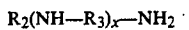

where $R_2$ is an alkyl radical having from about 12-20 carbon atoms, $R_3$ is an alkylene radical having from about 1-6 carbon atoms, and x has a value from about 1-5.

20. A motor fuel composition according to claim 19, in which said reaction product is obtained by reacting 1 mole of said maleic anhydride with about 1.5 moles of said polyether polyamine and about 1 mole of said hydrocarbyl polyamine.

21. A motor fuel composition according to claim 17 containing from about 0.001 to 0.1 weight percent of said reaction product.

22. A motor fuel composition according to claim 17 containing from about 0.01 to 0.05 weight percent of said reaction product.

23. A concentrate composition comprising 1.0-75.0 weight precent of the reaction product of claim 13 in admixture with a hydrocarbon solvent.

24. A concentrate composition according to claim 23, where said reaction product is present concentration range of 5.0-35.0 weight percent.

* * * * *